F. A. LAMBERT & F. H. HARDY.
ELECTRIC MOTOR VEHICLE.
APPLICATION FILED DEC. 19, 1914.
1,138,122.  Patented May 4, 1915.
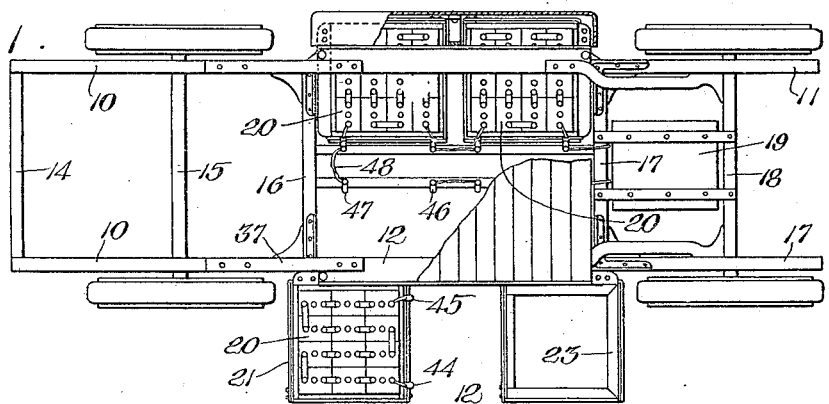
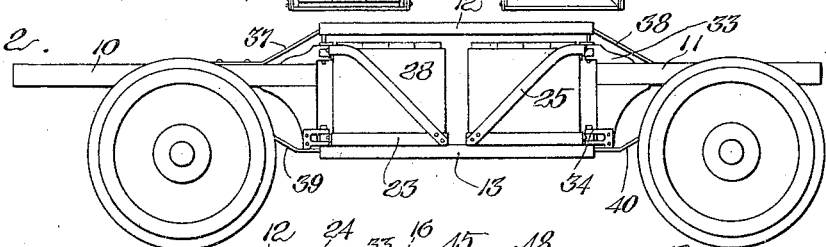
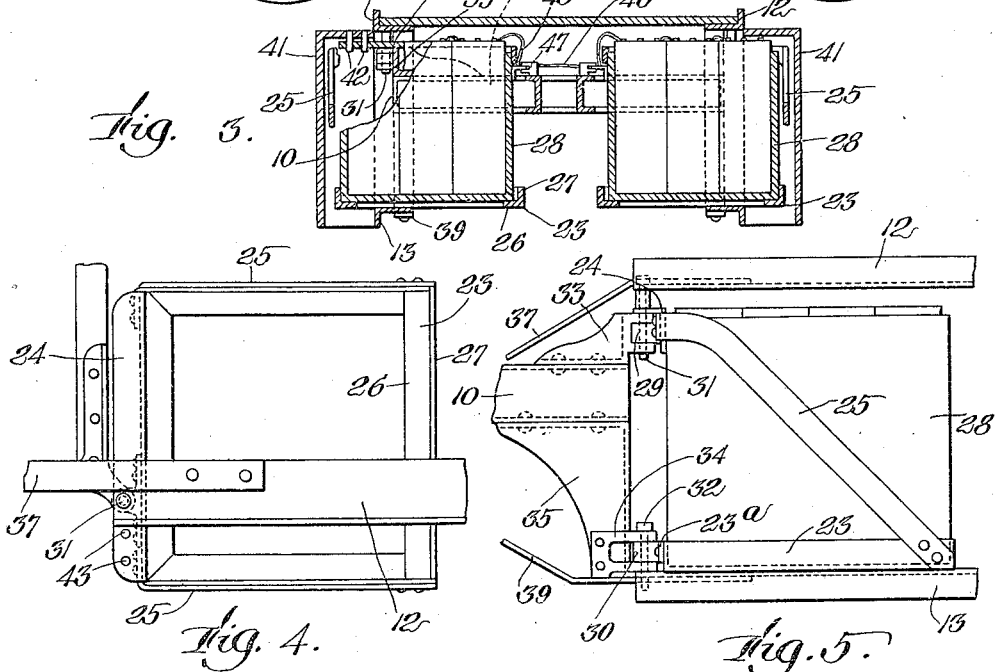

UNITED STATES PATENT OFFICE.

FRED A. LAMBERT, OF LAWRENCE, AND FRANK H. HARDY, OF ANDOVER, MASSACHUSETTS.

ELECTRIC MOTOR-VEHICLE.

1,138,122. Specification of Letters Patent. Patented May 4, 1915.

Application filed December 19, 1914. Serial No. 878,084.

*To all whom it may concern:*

Be it known that we, FRED A. LAMBERT and FRANK H. HARDY, citizens of the United States, and residents, respectively, of Lawrence and of Andover, in the county of Essex and State of Massachusetts, have invented certain new and useful Improvements in Electric Motor-Vehicles, of which the following is a specification.

This invention relates to motor vehicles driven by electric power and relates primarily to a new and improved means for mounting the storage battery by which such power is furnished, and to a novel construction of the frame, or chassis, of the vehicle adapted to permit the mounting of the battery in the desired manner.

The particular improvements and constructions which constitute our invention are described in the following specification in connection with the drawings forming a part of the same, wherein a practical and successful embodiment of the invention is illustrated. In the drawings we have shown only the frame of a motor truck with the battery associated therewith and the wheels supporting the frame, omitting the body of the vehicle for the sake of clearness.

Figure 1 is a plan view of the frame of a motor vehicle having the battery mounted thereon. Fig. 2 is a side elevation of the same. Fig. 3 is a cross section of the same. Fig. 4 is a plan view in detail of one of the pivoted holders adapted to carry a section of the battery and of the support therefor. Fig. 5 is an elevation of the same with the battery mounted therein.

The same reference characters indicate the same parts in all the figures.

Referring to the drawings, the characters 10, 10 represent the longitudinal side bars of the frame or chassis at the rear of such frame.

11, 11 represent the side bars at the forward end of such frame, and 12 and 13 designate bars forming the intermediate portion of each side element of the frame. These side members are connected and braced by transverse bars 14, 15, 16, 17, and 18. The front and rear wheels are also shown, no attempt being made to illustrate the manner in which one pair of wheels is mounted for steering, since the invention has no relation whatever to that part of the vehicle and any satisfactory mode of mounting the wheels for the purpose may be employed. The electric motor by which the traction wheels are driven is represented by 19. The storage battery is represented by 20, 20, 20, there being shown three of the four sections into which the battery is divided for convenience in mounting and handling. Each of these sections or units may be composed of a number of cells connected together in circuit in any usual or approved manner. Each battery section or unit is supported by a holder 21, said holders being independent of one another and independently pivoted to the frame so that they may be swung inwardly as shown in the upper part of Fig. 1 or outwardly as shown in the lower part of said figure to give access to the battery cells. A preferred form of holder for the battery unit is that best shown in Figs. 4 and 5, where such holder is represented as made up of a bottom frame or table 23, a top beam 24 parallel to and approximately equal in length to one of the members of the frame 23, and connecting straps 25 leading from the opposite ends of the top beam 24 diagonally to the corresponding ends of the bottom frame at the opposite side thereof from the bar 24. Conveniently the bottom frame is constructed of angle bars fabricated into a rectangular frame and so arranged that the flanges of the bars form an inwardly extending ledge 26 and an upwardly extending flange 27. The battery units are contained in boxes 28 which are set on the frame 23 within the space surrounded by the upright flanges 27 of the frame members, and resting on the ledges 26. The top bar 24 is located above the bottom frame by a distance approximately equal to the height of the box 28, as appears from Figs. 2 and 5, and the diagonal connecting straps or braces are located on the outer sides of the opposite members of the frame and far enough apart to admit the battery boxes freely between them. The top bar 24 and that member 23ª of the frame, which is directly beneath it, are provided with apertured pivot lugs 29 and 30, respectively, the apertures of which are in line, and these lugs are connected by pivot pins 31 and 32 with hinge brackets 33 and 34, respectively, the bracket 33 being secured upon the top side of the rear part 10 of the side member of the chassis and the bracket 34 being secured upon a hanger 35, which is attached to the under side of the member 10. In this way the holder for the battery unit is connected pivotally to the chassis so that it may swing thereon about a vertical axis. The above described construction of the holder provides a sufficiently strong structure adapted to support the great weight of the battery unit and the same time to be capable of swinging upon a pivot without cramping or excessive friction.

It will be noted that the battery units and the holders supporting the same extend partly above and partly below the forward and rear parts 10 and 11 of the chassis. Thereby the battery is supported at a height above the ground greater than is customary in electric motor vehicles. To permit of thus mounting the battery, the side members of the chassis are constructed in the manner herein illustrated, each side member, instead of being made as a single straight bar or beam, being constructed of four beam members 10, 11, 12, and 13, respectively, connected together by straps or tie members 37, 38, 39 and 40, said tie members being disposed as shown clearly in Fig. 2 and strongly tying the elements of the side member of the chassis together. Thus each said side member is in effect widened at its central portion and provided with an opening deep enough to permit the battery units to be moved in and out. When the battery holders are swung out as shown in the lower part of Fig. 1, their contained battery cells are brought out clear of the sides of the vehicle, whereby the tops of the cells are exposed and opportunities given to renew the electrolyte.

The evaporation of water from the electrolyte is quite rapid in the storage batteries of electric vehicles, and it is necessary frequently to fill the cells with water to replace the loss. To enable such renewals to be made easily, and also to give convenient access to the battery cells for other purposes, is the main object of our present invention. Heretofore in the electric vehicles which have come into use, and particularly in trucks and the like heavy vehicles, the batteries are hung below the chassis and can only be got at by pulling them out laterally. This has been a matter of a great deal of difficulty and inconvenience. Furthermore the low point at which the batteries are hung frequently causes trouble, particularly on rough roads, and when the roads are more or less blocked with snow and ice. Our invention makes it a matter of the utmost ease to swing out the batteries into an accessible position wherein the box containing the battery unit may be removed if necessary, or electrolyte may be poured into the cells without removal. The open construction of the frame at the part thereof where the battery is located enables the battery to be placed at a higher level than has been possible heretofore, at least in electric trucks, which is an added advantage.

In the illustrated embodiment of the invention the pivot points for the battery and unit holders are located between the ends of one of the sides of the holder, that is, not at the corner of the holder. This causes the holders to project outwardly from the chassis to a certain extent when they are swung in to the inward limit. In this way we utilize the space between the wheels outside of the chassis in order to accommodate a larger and therefore a more powerful battery than could otherwise be accommodated in a vehicle structure of the same size. When the battery units are thus swung inward, the portions thereof which project outside of the chassis are protected by covers 41 which overlie the top, outer side, and front and rear ends of the projecting parts of two battery units. These covers are provided with pins 42 or equivalent fastenings which enter apertures 43 in the flange of the top member 24 of the battery carrier.

Another feature of the invention which is of practical importance relates to a means for automatically coupling the sections of the battery in the motor circuit when they are swung inward, and for automatically disconnecting them when they are swung out, thus avoiding the trouble of manually disconnecting the connections, which has been a source of inconvenience with the batteries as heretofore arranged and mounted. For this purpose the terminals of the circuit constituted by each battery unit are connected with switch or coupling elements 44, 45 which are adapted to make contact with complemental coupling or switch elements 46, 47 mounted on parts of the frame structure. The fixed contact members 46, 47 of the several units are connected by conductors 48 with the proper contact members for the other units in such a manner that when the units are all swung into the normal position they will be connected in circuit in the desired way. The conductors 48 need not be touched when the battery units are displaced and replaced, because such conductors are connected with switch terminals fixed to the frame. It is immaterial to the present invention what the precise mode of connecting the cells or elements of the battery in circuit may be, although in the drawings they are shown for the purpose of illustration as being connected in series.

Our invention has been designed with particular reference to electric motor trucks, and the proportions of the embodiment of such invention herein illustrated correspond to those of a standard truck, but it is to be understood that the essential principles of the invention are applicable to other types and designs of vehicle and that such modifications as may be required to adapt the invention to such other types and designs of vehicle may be made without departing from the spirit of the invention.

What we claim and desire to secure by Letters Patent is:

1. In an electric motor vehicle the combination with the chassis of such vehicle, of a holder mounted pivotally upon said chassis to swing about a vertical axis and adapted to contain an electric battery.

2. In an electric motor vehicle the combination with the chassis of such vehicle, of a holder mounted pivotally upon said chassis and adapted to contain an electric battery, said holder being further so arranged that it may be swung about its pivotal axis into a position outside of the chassis and into another position more or less within the outer boundaries of the chassis.

3. In a motor vehicle, the combination of a chassis having a side member constructed with an open space between its forward and rear ends, of a battery holder pivoted to the side member at one end of such open space and being arranged to swing through said open space into positions respectively outside of and within the chassis.

4. In a motor vehicle, a chassis having a side member constructed of alined and longitudinally separated bars at the front and rear portion thereof respectively, and vertically separated bars connected to said forward and rear bars at their ends and extending across the space between said forward and rear bars, respectively above and below the line of said bars, and a battery holder connected on a vertical pivot to said side member at one end of the space between said front and rear bars and at a height intermediate the upper and lower bars, and a battery mounted on said holder.

5. In a motor vehicle, a chassis having a side member constructed of longitudinally separated forward and rear bars, and vertically separated upper and lower bars connected to said forward and rear bars and crossing the space between them, and a battery holder arranged to enter and issue from such space.

6. In a motor vehicle the combination with the chassis of such vehicle, of a battery holder pivoted to one of the side members of said chassis to swing about a vertical axis, into the space included between said side members, and outside of such space, the pivot for said holder being connected to the holder at a point intermediate the end of one of the sides thereof, whereby a portion of the holder is caused to project outside of the chassis when the holder is swung inwardly.

7. In a motor vehicle the combination with a chassis having a side member, of a battery holder consisting of a bottom frame, a top beam above and parallel to one of the members of said frame, and straps leading diagonally from the opposite ends of said top beam to the corresponding ends of the bottom frame, and hinges in vertical alinement connecting said top beam and the side of the bottom frame under said top beam to the side member of said chassis, said chassis being constructed to provide a space into and out of which said holder may be moved by swinging about said hinges.

In testimony whereof we have affixed our signatures, in presence of two witnesses.

FRED A. LAMBERT.
FRANK H. HARDY.

Witnesses:
P. W. Pezzetti,
H. A. Rahn.

Copies of this patent may be obtained for five cents each, by addressing the "Commissioner of Patents, Washington, D. C."